United States Patent [19]
Thompson

[11] 3,871,546
[45] Mar. 18, 1975

[54] COLLAPSIBLE BICYCLE CRATE

[76] Inventor: Neale Thompson, 2717 Hearst St., Elm Grove, Wis. 94709

[22] Filed: July 2, 1973

[21] Appl. No.: 375,711

[52] U.S. Cl..................................... 217/38, 206/335
[51] Int. Cl............................................ B65d 85/68
[58] Field of Search .......... 217/36, 37, 38; 206/335

[56] References Cited
UNITED STATES PATENTS
576,098  2/1897  Dunbar................................. 217/38
629,049  7/1899  Streat................................... 217/38

Primary Examiner—Leonard D. Christian

[57] ABSTRACT

A collapsible shipping device or crate is disclosed which when in its fully opened position will accommodate a partially disassembled bicycle for shipping purposes. Cross support members accommodate the portions of the bicycle and also serve to hold the parts of the bicycle in a substantially firm manner. The support members also serve to give rigidity to the frame defining the crate.

7 Claims, 3 Drawing Figures

PATENTED MAR 18 1975
3,871,546
FIG. 1.
FIG. 2.
FIG. 3.
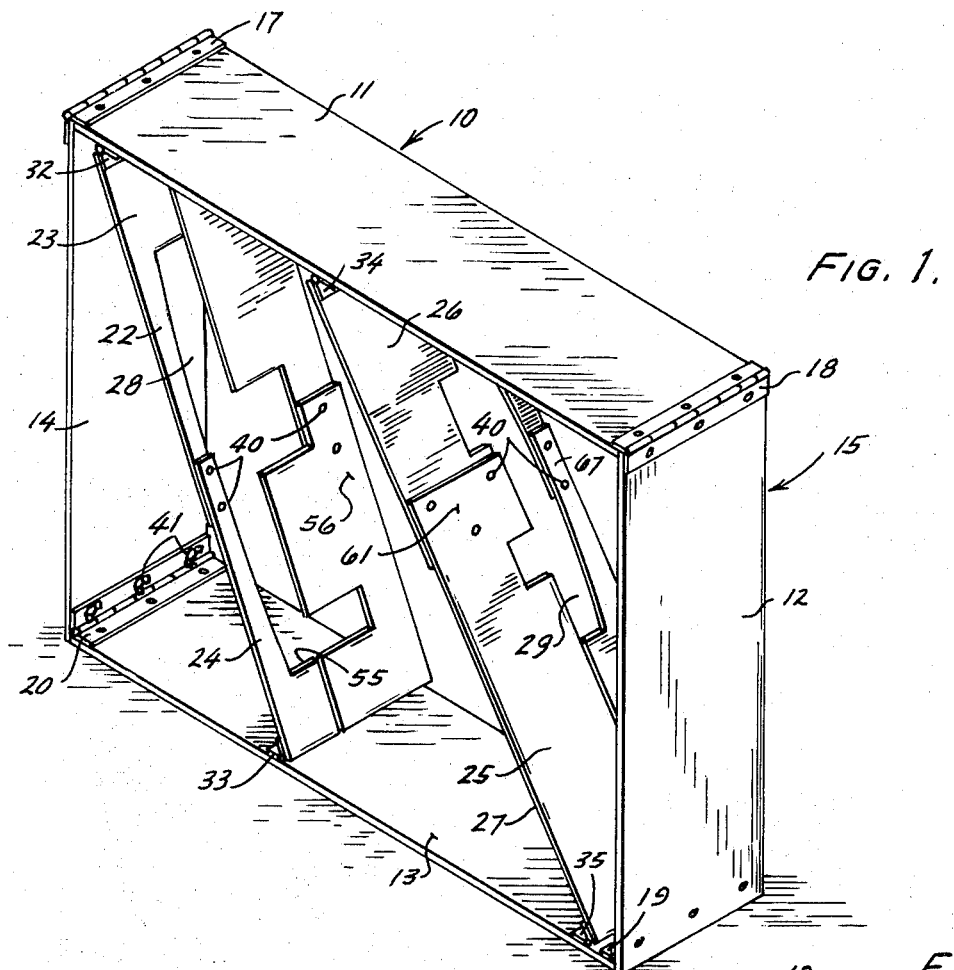
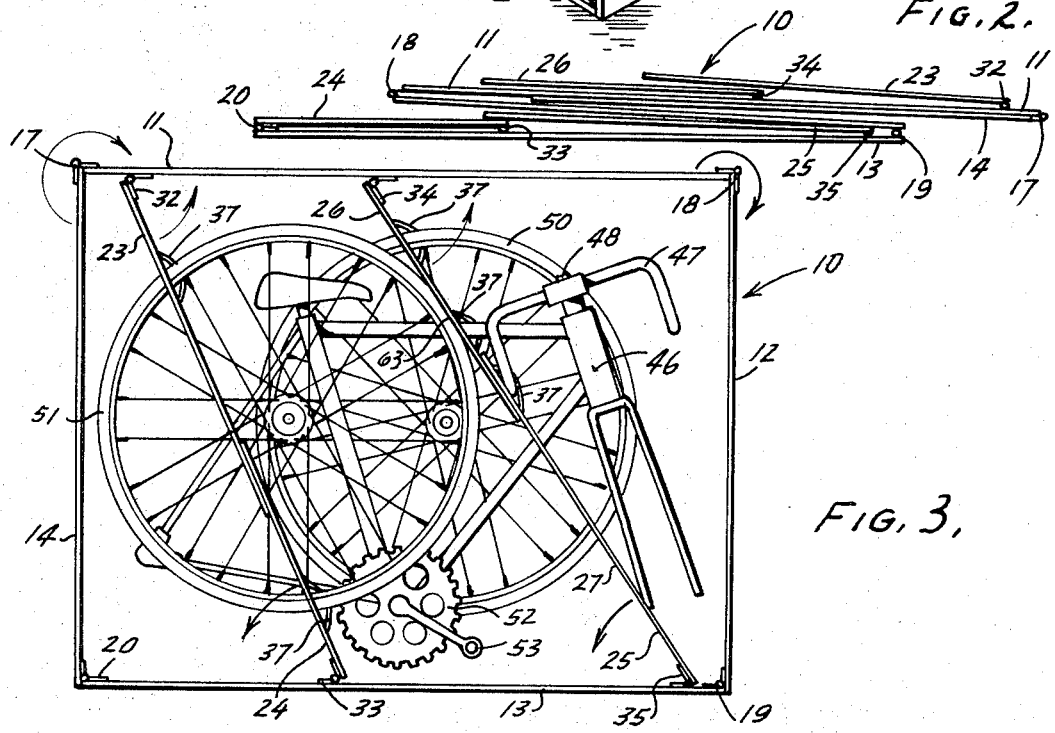

COLLAPSIBLE BICYCLE CRATE

BACKGROUND OF THE INVENTION

This invention relates to a shipping device and more particularly to a collapsible shipping crate for a bicycle which when in its partially disassembled condition can be accommodated within the crate and will be supported by means of support members inside the frame of the crate while at the same time presenting a rigid structure for the crate.

Prior methods of shipping a bicycle included lashing the wheels to the frame and shipping in an unprotected condition or shipping as it is in its normal state. Alternatively, the bicycle would be packed in a cardboard box, as required by Greyhound Bus Lines, and obtained from a bicycle store, or packed in a canvas bag. The disadvantages of these methods are lack of protection for the bicycle frame and component parts as well as the inconvenience of disassembly where this procedure was indicated. The problems concerned in shipping the bicycle without any protection are that the various projections are a cause of concern to such common carriers as the airlines and trucks. Further, a cardboard box cannot be shipped by United Parcel Service because it is too long, namely, longer than the 60 inch maximum length. The prior art nowhere provides a shipping crate or container for a bicycle which can be folded or collapsed so as to occupy a minimum amount of space yet when it is extended will provide a rigid structure for accommodating the bicycle and yet at the same time be of minimum overall dimension.

It is an object of the present invention to provide a novel shipping device or crate for a bicycle. It is another object of this invention to provide a collapsible shipping crate for a bicycle which is of minimum dimension in the collapsed state and also of minimum size when fully extended. It is still another object of this invention to provide a rigid frame like structure for crating a bicycle which will securely hold the bicycle in place inside the frame and at the same time afford a rigid frame structure surrounding the bicycle. It is yet another object of this invention to afford a novel collapsible shipping crate for a bicycle which is inexpensive to manufacture and can be manufactured without expensive tooling.

SUMMARY OF THE INVENTION

The foregoing objects are accomplished and the short comings of the prior art are overcome by the present collapsible bicycle crate which will accommodate a bicycle in only a minimal disassembled condition. A four-sided frame member composed of four wall portions are hinged to each other at the corners to define a frame member and to effect a substantially complete collapse of the frame member. Two support members extend from the top wall to the bottom wall and are also hinged to their adjacent wall portions. Openings are provided in the support members to receive portions of the bicycle and means such as elastic cords or rope are attached to the support members to surround portions of the bicycle to hold it in the support members as well as inside the frame. In a preferred manner, the support members are formed in two sections and are secured to each other by removable fastening means. Further, the frame itself is secured at one of the hinges by removable fastening means.

BRIEF DESCRIPTION OF THE DRAWINGS

A better understanding of the present collapsible bicycle crate will be afforded by reference to the drawing wherein:

FIG. 1 is a perspective view of the bicycle shipping crate in its fully extended position without the bicycle being contained therein.

FIG. 2 is a view in side elevation showing the shipping crate in FIG. 1 in a fully collapsed position.

FIG. 3 is a view in side elevation showing a partially disassembled bicycle as it is carried therein.

DESCRIPTION OF THE PREFERRED EMBODIMENT

Referring specifically to FIG. 1, it will be seen that the collapsible shipping device or crate 10 is composed of four external wall portions 11, 12, 13 and 14 to compose a substantially rectangular frame 15 which as seen in FIG. 1 is 38 inches in height, 48 inches in width and approximately 12 inches in depth. Joining each of the wall portions at their adjacent corners are four hinges 17, 18, 19 and 20. It will be noted that hinges 17 and 18 are placed outwardly of wall portions 11, 12 and 14 whereas hinges 19 and 20 are placed inwardly of wall portions 14, 12 and 13. Two internal walls affording support members 22 and 25 extend in an oblique manner between upper wall 11 and lower wall 13. They are joined to upper wall 11 by means of hinges 32 and 34 and to lower wall 13 by hinges 33 and 35. It will be noted that each support member 22 and 25 is composed of two upper and lower portions 23, 24 and 26, 27, respectively. They are joined to each other in the area of overlap by means of the usual carriage bolts such as shown at 40 and which will contain the usual wing nuts at the opposite sides so as to later provide a disassembled support member. Similarly, hinge 20 which joins lower wall portion 13 and side wall portion 14 also provides disassembly of wall portion 14 from hinge 20 by means of wing nuts 41 in hinge 20.

As best shown in FIG. 2, the collapsible shipping device 10 can be disassembled or collapsed to a total height of approximately 5½ inches by removing carriage bolts 40 from the support members 23, 24 and 26, 27 which will permit lower support members 24 and 27 to fall downwardly unto wall portion 13. For convenience, the carriage bolts 40 with wing nuts 41 attached are left in lower portions 24 and 27. Wing nuts 41 are then removed from hinge 20 and wall 14 will be pivoted in a back to back relationship over wall 11 and both walls 14 and 11 pivoted over wall 12 and lowered downwardly onto wall 13 with lower supports 24 and 25 inbetween and upper portion 26 positioned over portion 23 with the latter resting on wall 11. The collapsed crate will then be in the condition shown in FIG. 2.

OPERATION

A better understanding of the advantages and novel aspects of the shipping crate 10 will be had by a description of its operation.

From the collapsed state as shown in FIG. 2, the wall portions 11, 12 and 14 will be raised upwardly in a reverse manner as indicated in the previous paragraph. With wall 14 being secured to hinge 20 by means of wing nuts 41, upper and lower supports 23,26 and 24,27 will be partially joined together at their areas of largest overlap, 60 and 61, by means of carriage bolts 40 and nuts (not shown). The shipping crate will then take the form as shown in FIG. 1. To place a bicycle such as 45 in the frame 10 it is merely necessary to remove the front and back wheels 50 and 51, respectively, and to remove the pedal opposite the sprockets chainwheels or to reverse it on bicycle crank arm 53. The handlebar binder bolt 48 is also loosened. Bicycle frame 46 will be placed through openings 29 and 28 with sprocket 52 positioned above floor 13 and away from support 24. Front wheel 50 will then be placed through the opening 29 in support member 25 and will rest against support member 22 at the position shown at 56. It will be held against adjacent portions of the support 25 defining slots 29 and 22 such as by elastic cord bands 37 secured to supports 25 and 22. Handlebar 47 will swing up or down to remain within the frame and is strapped by means of an elastic band 37 to the adjacent portion of support 25. Back wheel 51 will then be placed in opening 28 adjacent the rear portion of bicycle frame 46 and will rest at point 55 and be secured in opening 28 by elastic bands 37 holding the wheel against the adjacent portions of the support member 24 defining the opening 28 also against the back of support 25 at tangent point 63. The bolting of supports 23, 26 and 24, 27 will be completed at the areas of smaller overlap 66 and 67. In this manner, bicycle 45 is ready for shipment and will be securely held in the frame. By means of support members 24 and 25 extending in an oblique manner between floor 13 and upper wall 11, a very rigid frame 10 is afforded even though in a preferred manner, all of the wall portions 11, 12, 13 and 14 are formed of plywood as are support members 22 and 25.

In the preferred manner, support members 22 and 25 are hinged to the respective wall portions 11 and 13. If desired, the hinges 32, 33, 34 and 35 could be eliminated and a slot fit arrangement could be provided. Support members 22 and 25 are located to optimize their position by affording triangular support portions in crate 10 for stability purposes, while these supports are shown as being fabricated in two disconnectable sections such as 23, 24 and 26, 27, they could instead be fabricated in one piece. Neither is it necessary that two supports 22 and 25 be provided. If decided, one such support could extend approximately diagonally from wall portion 13 to wall portion 11. However, the two support design does afford a more rigid construction. While elastic cord bands 37 are indicated for use to hold adjacent portions of the bicycle such as the wheels 50 and 51 and the frame 46 against adjacent portions of the supports 22 and 25 in openings 28 and 29, these could be substituted with ordinary rope or mechanical type connections such as U-bolts which would be suitably protected by a non-marring finish. The preferred material for composing the bicycle shipping crate 10 is plywood for the wall portions and the support members, if desired, plastic materials such as nylon or polypropylene and various other plastic resinous substances could be substituted for the plywood or for metal hinges 17, 18, 19, 20, 32, 33, 34 and 35.

It will thus be seen that through the present invention there is now provided a shipping crate for practically any sized bicycle which can be collapsed to a minimum height yet in an extended postion is readily acceptable for shipping by all of the common carriers. The shipping crate is easy to assemble and disassemble and only minor disassembly of the bicycle is required. The shipping crate is rigid in its construction being supported from top to bottom by two support members which also affords support for the component parts of the bicycle. Inexpensive materials can be used in the fabrication of the shipping crate and no special tooling is required.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A collapsible shipping device for protecting a partially disassembled bicycle comprising: external wall portions defining a frame member, hinge means disposed in said frame member to effect a substantially complete collapse of said frame member, at least one internal wall member extending from one of said external wall portions to another of said external wall portions, at least one opening in said internal wall member to receive portions of said bicycle and means to removably secure said portions of said bicycle within said opening of said internal wall member.

2. The collapsible shipping device as defined in claim 1 and further comprising fastening means for securing said hinge means to said external wall portions, one of said fastening means being removable in order to disconnect one of said external wall portions at a corner of said frame member from another of said external wall portions adjacent thereto.

3. The collapsible shipping device as defined in claim 1 wherein two of said internal wall members are secured in spaced apart positions within said frame members so as to extend from one of said external wall portions to another opposite thereto.

4. The collapsible shipping device as defined in claim 3, wherein each of said internal wall members comprises a section hingedly connected to one of said opposite external wall portions, another section hingedly connected to the other of said opposite external wall portions, and separable fastening means connecting said one section to said other section of said internal wall member.

5. A collapsible shipping device for a partially disassembled bicycle comprising: a bottom wall portion, a top wall portion and two end wall portions defining a frame member; hinge means disposed in said frame member to effect a substantially complete collapse of said frame member; two internal wall members connected to said bottom and top wall portions so that one of said internal wall members will extend obliquely upward from the end of said bottom wall portion adjacent to one of said end wall portions and so that the other of said internal wall members will extend obliquely downward from the end of said top wall portion adjacent to the other of said end wall portions, each of said internal wall members having at least one opening to receive portions of said bicycle; and means to removably secure said portions of said bicycle within said opening of each of said internal wall members.

6. The collapsible shipping device as defined in claim 5 wherein said means to removably secure said portions of said bicycle within said opening of each of said internal wall members is an elastic band member.

7. The collapsible shipping device as defined in claim 5 wherein said frame member and said internal wall members are all fabricated from plywood.

* * * * *